United States Patent [19]

Gordon

[11] 4,130,751

[45] Dec. 19, 1978

[54] METAL ORNAMENTATION AND METHOD OF WELDING

[76] Inventor: Stanley H. Gordon, 75 Laurel St., Concord, Mass. 01742

[21] Appl. No.: 737,169

[22] Filed: Nov. 1, 1976

[51] Int. Cl.² .............................................. B23K 9/20
[52] U.S. Cl. ..................................... 219/98; 85/9 W; 85/10 E; 219/99; 403/270; 403/288
[58] Field of Search ................ 85/9 W, 10 E; 219/98, 219/99, 136, 91.21; 403/270, 288

[56] References Cited

U.S. PATENT DOCUMENTS

| 2,611,285 | 9/1952 | Gross | 403/288 |
| 2,775,685 | 12/1956 | Webster | 219/99 |
| 3,488,466 | 1/1970 | Poupitch | 219/98 X |

Primary Examiner—E. A. Goldberg

[57] ABSTRACT

A part structure adapted for attachment to a metal base by welding, particularly an ornament for attachment to an automobile body. The part structure or ornament is a metallic, electrically conductive member and has at least one weld stud affixed thereto. A resilient seal surrounds the weld stud and effects a seal around the weld stud and the weld produced thereby during welding.

7 Claims, 8 Drawing Figures

METAL ORNAMENTATION AND METHOD OF WELDING

BACKGROUND OF THE INVENTION

The present invention relates to a novel part structure for metal ornamentation which enables attachment of ornamentation to finished appliance and auto bodies by welding, and more particularly, to one which permits welding through paint and through vinyl coverings without discoloring areas adjacent the welds, and which seals the welds against corrosion.

In the appliance and automobile industries, ornamentation such as nameplates, medallions, letters, and script has generally been attached to finished body panels by means of various fasteners which require mounting holes. Studs, integral with the ornament, are pushed through the mounting holes, and must then be fastened with thread-cutting stampings filled with a sealer, using a power tool. A particular pattern of mounting holes is required for each type of ornamentation. In the automobile industry especially, many models are produced from the same basic body, and each is identified by a different ornamentation. Since there is no common hole pattern, the basic body cannot be prepunched to accommodate the several types of ornamentation needed for the model types produced. As a result, automakers are forced to drill from 50 to 70 percent of these holes by hand, on the assembly line. Only those certain holes which are common to all models can be prepunched.

Although the hole drilling on the production line is fixtured, pressure on the drill flexes the unsupported panel inwardly, elongating the hole, and changing its spacing with respect to adjacent holes. Many types of ornaments, especially the push-in type applied to the front side of a panel, require close fitting holes for adequate retention and sealing of the cut metal surfaces. Where the holes have been elongated and torn, corrosion can occur. Where spacing is improper, ornament breakage is common during assembly, as well as loose ornaments which fail to hold, and stick out from the side of the body. Rust streaks appear even on new cars, where the hand drilled holes have not been completely sealed.

Prepunched hole costs and hand drilled hole costs, multiplied by the 20 or 25 per body for ornamentation mounting, add up to millions of dollars annually in direct labor. In addition, ornament placement is limited to locations where there is no structure behind the panel, and often to where access is available from the inside, in order to make a proper attachment. This frequently results in less than the best aesthetics, and much of the effectiveness of the ornament may be lost. Efforts to overcome this difficulty by use of fasteners that can be driven in from the front now are used in about 10 percent of all ornament attachments. However, these are very easily removed by vandals, and are also subject to being detached in car washes, especially if the body holes have any amount of elongation.

In 90 percent of the ornament attachments, thread cutting devices are power driven onto the ornament studs from the back side of the panel. The power tool is often used at extreme angles due to access conditions, and studs are frequently cut off during the operation, requiring repairs. Often the job requires two men, one to hold the ornament or letters in position on the front side of the panel, and a second man to apply the fasteners on the opposite side.

When attaching through vinyl covered panels, the vinyl often has prepunched holes to match body holes, and it requires specially trained, premium paid workers to lay and apply the vinyl covering so that the holes match and the ornaments can be attached.

Efforts are constantly being made to eliminate the high costs and problems resulting from the use of fasteners which require mounting holes in the body, by attaching ornaments and trim with adhesives. However, the fine oil mist prevalent in assembly plants, as well as the fine dust, the spatters of grease, fingerprints, etc. on the finished bodies tend to defeat adhesive attachments. One sees letters missing from automobiles, and the longer trim strips are often seen at the sides of highways. On paints with some metallic pigments, long a favorite in the industry, adhesives are much reduced in holding ability. At best, they can only grip the paint, not the body, and paint adhesion to the body is a constant industry problem. If such an attachment pulls away, it could remove an area of body paint leaving an unsightly condition.

Delicate script ornaments have very little attachment area for an adhesive, and attachments must depend on area for strength. Therefore, they do not adhere to the body reliably.

Larger pieces of die cast metal script have another problem. The curves in body panels are not all identical from body to body, and there is also some warp often found in the script or nameplate. Adhesive mounting of such pieces is not strong enough to straighten out the warp, or to force a script piece to follow a wandering panel curve, and failures result.

Various methods of ornament attachment by welding have been proposed, but no system is currently able to meet all of the requirements for the attachment of metal ornamentation.

SUMMARY OF THE INVENTION

Having in mind the limitations of the prior art, it is a primary object of the present invention to provide an ornament construction directly weldable to finished appliances and automotive panels, through paint and vinyl cover.

Another object is to provide means to contain the tar and burning gases which are explosively generated during the weld by the paint and metal at molten temperatures, by means of a seal.

Another object is to provide a seal construction which will completely contain the weld balls and molten particles from the weld, and at the same time permit the weld followup to occur, without obstruction of the travel of the ornament towards the panel.

Another object is to afford a positive seal at each weld which will permanently exclude moisture and water from the site, thereby preventing corrosion.

A further object is to provide a seal which will foreshorten axially and expand radially during the weld, while fully containing the pressure of the expanding gas and weld particles.

In addition, it is an object to provide attachments by welding which will have consistent strength, sufficient to resist pressures from freezing and thawing of ice, impacts, car wash brushes, and the efforts of vandals.

Another object is to reduce body manufacturing costs by eliminating body holes and attaching ornamentation by welding.

A further object is to provide conductivity thru the ornament body and weld stud to the panel so that after the attachment is made, any ornament can serve a further purpose of being an electrical grounding point for the welding of additional ornaments to the same panel.

An additional object is to provide a weld-on ornament construction so that ornaments can be located anywhere on the body, unrestricted by structures behind the panel.

A further object is to reduce the labor of attachment by employing fixturing and automatic welding, using a weld-on ornament construction.

Another object is to provide an ornament construction weldable to a panel through any type of paint system, including metallic paints, and through thin and thick vinyl coverings, such as the current wood grain finished vinyls, and the vinyls used for hard tops.

In addition, it is an object to provide an ornament construction for weld-on attachment which requires a relatively small part width at the weld location, to reduce the line width of the script as much as possible.

Another object is to provide secure means of attachment of the pointed welding stud to the ornament, with a very low profile cross section ornament.

A further object is to utilize the welding load on the ornament and panel to straighten out warped ornamentation and to then constrain them in proper shape by welding the part to the panel.

These objects are accomplished in the present invention by using a part structure or ornament which is adapted for attachment to a metal base, such as an automobile body, by welding. The part structure is a metallic, electrically conductive member having at least one weld stud affixed thereto. Around the stud is placed a resilient seal and this seal effects a seal around the stud and the weld produced thereby during the welding of the stud to the metal base.

More specifically, the part structure has a metallic, electrically conductive body member having an exterior side and an interior side, the interior side having a continuous outer edge adapted for contact with an underlying uncoated or coated metal surface and a central recess spaced within the outer edge. A metallic weld stud is permanently mounted in the body member at one end thereof within the recess and is spaced from the continuous outer edge of the interior side and preferably from the exterior side for concealment thereby. Its free end may have a sharp point extending beyond the interior side of the body member for contact of the point with a coated metal surface prior to contact therewith by the outer edge of the body member. A resilient and deformable elastomeric seal element surrounds the weld stud and is spaced inwardly from the outer wall of the recess. It may have one end thereof in contact with the bottom wall of the recess and the other end adjacent the point of the weld stud for contact with the coated metal surface substantially simultaneously therewith. Preferably, the seal element has a substantial volume less than that of the recess for substantial filling thereof after welding deformation.

According to the method of the invention, upon application of electrical current and mechanical force to the exterior side of the body member, the point of the weld stud, if pointed, will penetrate the coating and contact the metal surface for electrical connection and welding of the stud to the metal surface while the seal element continuously deforms within the recess to maintain a resilient seal in contact with the underlying surface around the weld stud and the weld produced, thereby providing containment of welding products during the welding cycle while the outer edge of the interior side of the part structure moves toward the metal surface as the weld stud shortens and thereafter.

Other objects and advantages of the present invention will become apparent during the course of the following description.

BRIEF DESCRIPTION OF THE DRAWINGS

In the accompanying drawings given by way of example.

DESCRIPTION OF THE PREFERRED EMBODIMENTS

Figure 1:
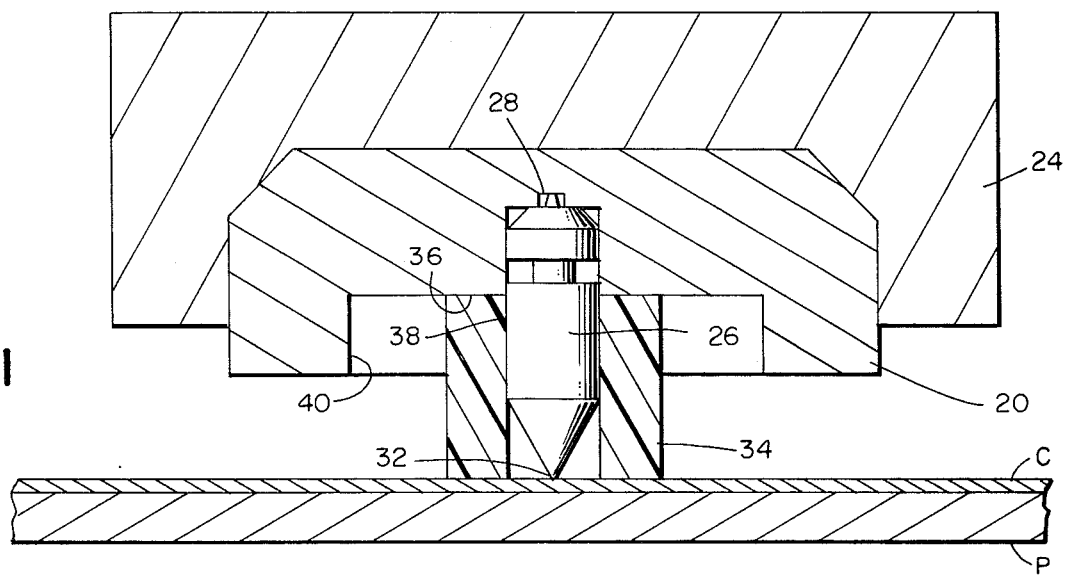
FIG. 1 is a cross sectional view of a zinc die cast ornament with assembled welding stud and seal element, shown before welding.

Referring now to FIG. 1, an ornament 20 is shown, seated in an electrode 24, and in position for attachment to panel P through coating C. In general, ornament 20 has an exterior side, shown seated in electrode 24, and an interior side having a continuous outer edge for contacting the underlying coated metal panel P. The continuous outer edge of the ornament 20 defines a central recess therewithin. Typically, ornament 20 is zinc die cast, although it could be an aluminum forging or other metallic trim, and it is electrically conductive. Weld stud 26 is assembled to ornament 20 by a press fit, and recess 28 accommodates an occasional cut-off nib on stud 26. Commonly, weld stud 26 is a screw machine part, having a very sharp point 32. In general, weld stud 26 is permanently mounted in ornament 20 within its recess and spaced from the continuous outer edge of its interior side as well as from the exterior side for concealment thereby. Its point 32 extends beyond the interior side of ornament 20 for contact of point 20 with panel P prior to contact therewith by the outer edge of ornament 20.

Weld stud 26 can be made from a free cutting screw machine stock such as those containing small amounts of sulfur and lead, without appreciable effect on subsequent weld strength. The point 32 may be cut to a 75° included angle. Angles less than 60° create difficult weld follow-up conditions, while angles including 90° and larger do not penetrate paint adequately. Point 32 should not have tool marks along the sides which can be seen without a glass, but should have a smooth appearance. Heat treatment of weld stud 26 is needed for optimum paint penetration, and to retain the integrity of point 32 if it should be necessary for it to penetrate the paint more than once, due to equipment tests or electrical grounding problems. Heat treatment by gas carburization produces a very hard point 32 and surface hardening of the entire stud. However, depth of hardening should not exceed a few thousandths of an inch, in order to avoid introducing too much carbon into the weld, which would tend to embrittle it. Tests have shown that surface carburizing has no significant effect on weld ductility when the hardened zone does not exceed a depth of 0.003 inch.

Typically, panel P may have a coating C of galvanized zinc, a primer coat, and a finish coat of lacquer or enamel paint. It may also have a layer of decorative vinyl, or of heavier vinyl such as is frequently used for car top applications. Paint thickness does not vary significantly from body to body where lacquer is used, because when a body is repaired and retouched, a "reflow" of the paint occurs in the baking process, and excess paint tends to run off. With enamel, however, if the same panel should require repair several times in production, paint build up occurs. Thicknesses exceeding 0.008 inch are very rare, and as will be described later, attachments made under these conditions are done under the same weld schedule as is used for attachments made through vinyl.

A resilient and deformable elastomeric seal element 34 surrounds the weld stud 26 and is spaced inwardly from the outer wall of the recess in ornament 20. It has one end in contact with the bottom wall of the recess and the other end at the weld stud point 32, for contact with the coated metal panel P substantially simultaneously therewith. Preferably, seal element 32 has a volume slightly less than that of the recess for substantial filling thereof after welding deformation. The seal element 34 is typically a section of neoprene tubing of about 90 durometer. Due to the brief duration of the weld, as will be described later, heat resistance is not the primary physical requirement of the material, but is secondary to tensile strength, which is needed to resist the explosive expansion of the gases generated by the weld. Elastomers having a tensile strength and heat resistance superior to neoprene would be preferred over neoprene so long as they can be cemented to the ornament 20 and weld stud 26, as is shown in FIG. 1 at surfaces 36 and 38. Firm attachment of seal element 34 to weld stud 26 is necessary in order to prevent its dislodgement during handling and shipping of ornament 20.

Commonly, cement is applied to the pre-cut seal elements by immersion in a relatively thin formulation of neoprene based adhesive, and then centrifuged, separated on a tray, and oven dried at 275° F. The ornament 20 is also coated with adhesive of the same formulation, which is applied at surfaces 36 and 38 after assembly of weld stud 26. Ornament 20 is then baked at 275° F. until the cement is dry. During assembly of the seal element 34, the surfaces 36 and 38 are activated by an application of solvent of a type suitable to the adhesive, and when seal element 34 is assembled, a firm bond will result.

Figure 3:
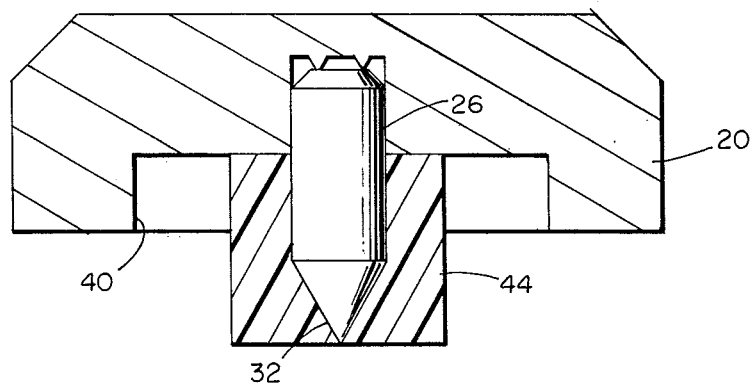
FIG. 3 shows in cross section an ornament assembly in which the seal element has been applied by a casting or molding process.

The seal element may also be cast, as is shown in FIG. 3 as seal element 44. In order to accomplish this, suitable molds can be located on a moving belt, and filled with a casting material, such as polyurethane or vinyl. Ornament 20 with weld stud 26 assembled can then be placed in a nest, with point 32 down, extending into the center of the cast material. The part is then carried through a curing oven which cures the seal elements, and bonds them to surfaces 36 and 38.

The seal elements can also be molded to ornament 20 and stud 26 in an injection molding press, using a material such as ethylene vinyl acetate copolymer, or in a compression molding press using neoprene or other suitable elastomer.

Upon application of electrical current and mechanical force to the exterior side of ornament 20 by electrode 24, point 32 will penetrate coating C and contact the metal surface of panel P while seal element 34 continuously deforms within the recess to maintain a resilient seal in contact with the underlying surface around weld stud 26 and the weld produced, thereby providing containment of welding products during the welding cycle while the outer edge of the interior side of ornament 20 moves toward panel P as the weld stud 26 shortens and thereafter.

Figure 2:
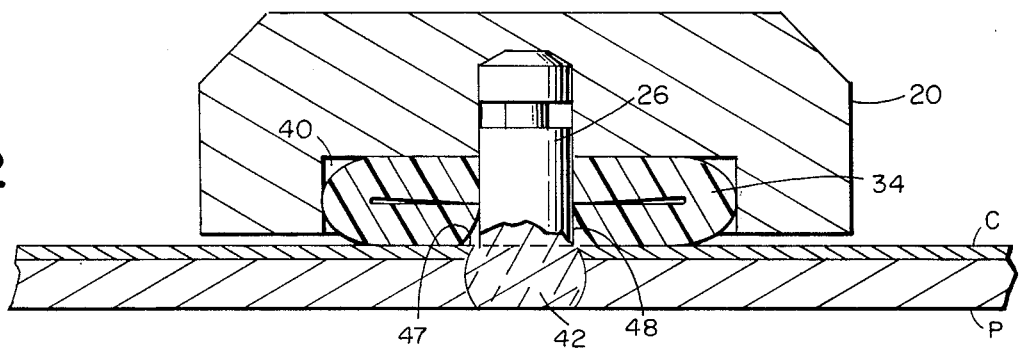
FIG. 2 shows the ornament assembly of FIG. 1 in cross section, after it has been welded to a panel.

FIG. 2 shows the configuration of FIG. 1 after welding has taken place. Seal element 23 has foreshortened in the axial direction, and expanded radially, as the weld stud 26 moved toward panel P with the melting of its point 32. With ornament 20 now attached and welded to panel P, the deformed seal element 34 is accomodated in recess 40 to allow a minimum gap of 0.000 to 0.010 inch between panel P and ornament 20. A weld nugget 42 has been formed by the weld. All of the explosively generated gases from the burning paint and seal interior, along with the tar and metal weld balls, and possibly the products from burning vinyl, have been contained by the seal, especially in the areas marked 47 and 48, leaving the finished surfaces adjacent the weld clean, and permanently sealing the weld against water and moisture. The seal element 34 is now compressed between panel P and ornament 20. The seal element 34 now takes on a new function, in addition to forming a tight, permanent seal. By maintaining a load against the ornament 20, distributed evenly around the weld, it serves to dampen vibration shocks which may be transmitted through the vehicle body, thereby contributing to the resistance of the weld joint to vibration. It is also obvious that where an ornament 20 is attached to a curved panel P, the seal will follow any such curve and maintain a positive seal with the paint. This characteristic is of especial importance during the weld follow-up, which will be described later, since the panel P changes its curve during the weld, and the seal must contain all of the explosively generated gases and metal particles during the weld. If not contained, such gases could tar the finished panel adjacent the weld, and escaping weld balls would lodge under the ornament, to cause unsightly rust streaks when weathered.

FIG. 3 shows the ornament 20 having a cast seal 44 which is bonded to the weld stud 26 and ornament 20, for security against dislodgement during parts handling.

Figure 4:
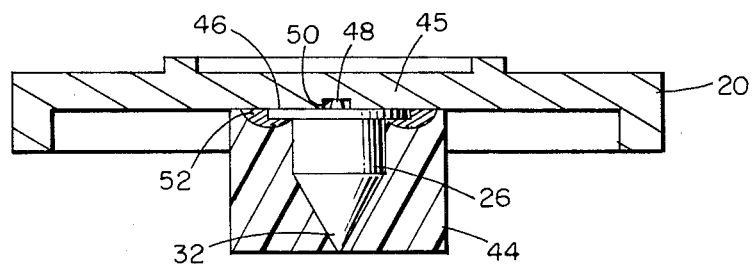
FIG. 4 shows an ornament assembly in cross section, in which the welding stud is affixed to the ornament by solder.
Figure 5:
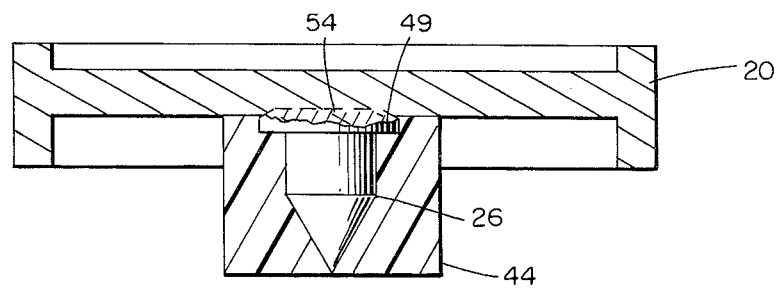
FIG. 5 shows a cross sectional view of the stud attachment to an ornament by means of capacitor discharge drawn arc welding, by mechanical welding such as spin welding and ultrasonic welding, and by resistance heating of the stud-ornament interface by electric current.

The ornament 20 shown in FIG. 4 is illustrative of a low, flat construction, in which it would be impractical to mount a weld stud 26 by a press fit, due to the thinness of section 45. Here, weld stud 26 is produced with a thin, flat head 46, and a locating nib 48 which fits into a recess 50. Ornament 20 is inverted, and nib 48 is located in recess 50. A solder ring 52 is then dropped over stud 26, and the assembly is passed through a solder oven or heated in a suitable manner. The solder melts and flows around head 46 and adjacent surfaces on ornament 20, and upon cooling, head 46 is securely soldered to ornament 20. Subsequent welding of the stud 26 is done with a very short weld schedule, as will be described later, so that heat reaching the solder joint 52 will be insufficient to melt it. The zinc ornament 20 acts as a very good heat sink, and the solder selected is of low electrical resistance, so that heating by conduction of the welding current is minimal. Attachment of weld stud 26 to ornament 20 by spin welding is shown in FIG. 5. The weld stud 26 is rotated rapidly in a spin welding press, and plunged against the surface 54. When the interface heat developed melts the zinc of surface 54, the molten metal blends, under rotation and pressure, with the surface of the weld stud head 49, and at just this time the rotation is stopped, while the axial load is maintained. When the zinc becomes solid a split second later, the load is released. A strong bond can be obtained between head 46 and ornament 20 in this way, and because of the low resistance of the interface bond at surface 54, subsequent conduction of weld current will not re-melt it.

Another method of attachment of weld stud 26 to ornament 20 is also shown in FIG. 5. Weld stud 26 can be joined to ornament 20 by a drawn arc welding operation, in which electrical contact between stud 26 and ornament 20 is made, at the exact site where the stud 26 is to be attached, and then stud 26 is raised from the surface, drawing an arc. The arc melts both the surface of the stud head 46, and the zinc surface 54. At this instant, the current is shut off and the head 46 is plunged into the molten pool in the zinc surface 54. A low resistance joint is formed which will not re-melt with the conduction of a brief weld current. This type of joint has superior strength because the surface of head 46 melts somewhat, increasing the area of contact.

Figure 6:
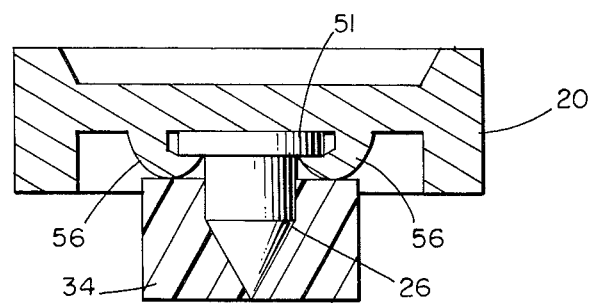
FIG. 6 shows in cross section the attachment of a weld stud to the ornament by crimping.
Figure 7:
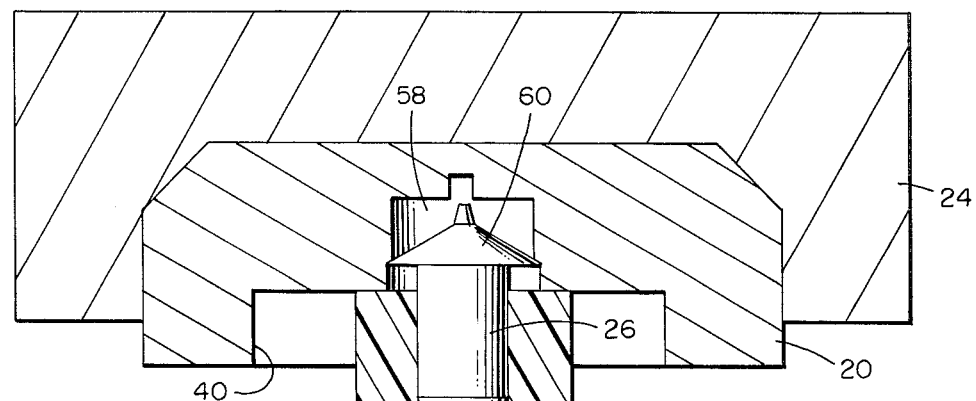
FIG. 7 shows in cross section a stud design which will mold itself into the body of the ornament when heated by the welding operation.

In FIG. 6 is shown another method of attachment of weld stud 26 to ornament 20. The ornament 20 is produced with a rim 56 which can be mechanically crimped over the stud head 49, thereby securing it. Such crimping must be done at temperatures above room temperature, in order to avoid cracking the material. A warm air heater can be used to raise the temperature of ornament 20 to about 90° F. for crimping In FIG. 7 weld stud 26 is held in ornament 20 by a press fit, until the time of attachment to the panel P. During attachment, current from electrode 24 passes through ornament 20, weld stud 26, and panel P, in a manner to be described. Heat is developed at the electrical interface between the ornament 20 and the weld stud head 60. This causes some melting of the zinc, and further heat can be added by a post-heat weld schedule.

Figure 8:
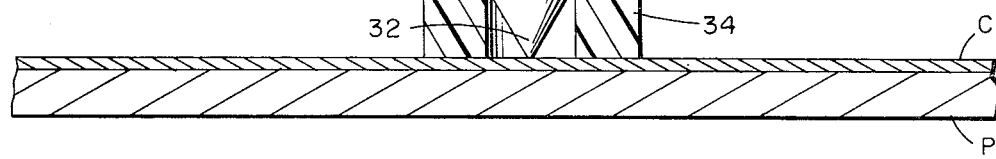
FIG. 8 shows the stud design of FIG. 7 after welding.

FIG. 8 shows the result after weld, with some of the melted zinc having flowed around head 60, securing it firmly to ornament 20.

To attach the ornament 20 to a painted, finished panel such as the fender of an automobile on a production line, the ornament 20 is placed in a fixture having means of attachment to the fender. A ground connection to the fender, or to an appropriate part of the body is made with a ground clamp. In some instances, where an unpainted area cannot be found for attachment of the ground clamp, the clamp is provided with teeth which can penetrate the paint. Where this is not desired, due to the possibility of corrosion subsequently, a stainless steel weld stud can be attached to the back side of the panel prior to painting, and a ground clamp with teeth can be attached to it for the welding operation.

Alternately, two ornaments may be attached to the same panel simultaneously, without use of a ground cable, by passing current in series through one ornament into the panel, and out through the other ornament.

It is an important feature of this invention that the electrical contact between the ornament and the weld stud is not broken by the welding operation, so that any attached ornament may be used as an electrical ground for welding another ornament to the same panel. Three ornaments can be welded by welding two of them in series, and then the third can be welded using the first attachments as a ground.

The welding fixture typically is suspended from an overhead beam by an air hoist, so that it can be easily raised or lowered, and it is free to move along with the car body by reason of a carriage which supports the weight and rolls freely along the beam over the production line.

When the welding fixture is located on the fender and clamped into position, an electrode, operated by an air cylinder, presses the ornament into the panel. Weld studs 26 penetrate the paint, making electrical contact at loads ranging from 3 to 7 or 8 pounds per weld stud. At the time of welding, the load is typically 30 pounds per stud. Although it is not unusual to have three or even four studs per ornament, the fender curvatures are usually sufficient to support the load during welding. If in a particular application the load should be excessive, the panel can be supported by a fixture, or welded in a vacuum cup. It is also possible to obtain good attachments with loads as light as 20 pounds per stud, by using lower current. This can be considered in certain applications, although higher loads are desirable for complete reliability in paint penetration in production.

A gun type transformer of 5 KVA is sufficient if located close to the welding fixtures, and a control having three heats would handle all of the modifications disclosed in the ornament construction. Typically, however, only two heats are needed. A weld current of three cycles of preheat, at 450 amps per weld stud, followed immediately by three cycles of current at 1800 amps per stud, make the attachment. Preheat initiates the heating at a relatively low level, and enlarges the contact area, causing the paint to vaporize at the immediate point. This is necessary to prevent violent gas expansion during the weld, which would tend to reduce weld strength and overstress the seal. Where vinyl is used over the paint, or where paint thickness exceeds about 0.008 inch, greater weld strength can be obtained by reducing the current about 100 amps per weld stud 26. This is due to the additional containment of heat by these insulative materials, so that the weld would become too hot unless current is reduced somewhat. Excess heat tends to dissipate the point 32 more rapidly than it can move toward the weld, resulting in arcing and loss of weld strength.

Where ornament 20 has several weld studs 26, all may be welded simultaneously. However, it is important that the load on each stud 26 be equal, which will have the result of equal division of the welding current. To accomplish this end, it is good practice to provide an air cylinder for each weld stud 26 to be welded. If all cylinders are indentical and connected to the same air supply, all loads will be substantially the same.

When the attachment is made, the fixture can be instantly removed, and reloaded with ornamentation for the next body.

The scope of the invention is defined by the appended claims.

I claim:

1. A part structure adapted for attachment to an underlying metal surface by electric welding, comprising
   a metallic, electrically conductive body member having an exterior side and an interior side, said interior side having a continuous outer edge adapted for contact with said metal surface and a central recess spaced within said outer edge
   a metallic weld stud permanently mounted in said body member at one end thereof within said recess and spaced from said continuous outer edge of said interior side with its free end extending beyond said interior side of said body member for contact with said metal surface prior to contact therewith by said outer edge of said body member
   a resilient and deformable elastomeric seal element surrounding said weld stud and having one end thereof in contact with the bottom wall of said recess and the other end adjacent the end of said weld stud for contact with said metal surface substantially simultaneously therewith, said seal element having a substantial volume less than that of said recess
   whereby, upon application of electrical current and mechanical force to the exterior side of said body member, said free end of said weld stud will contact said metal surface for electrical connection and welding of said stud to said metal surface while said seal element continuously deforms within said recess to maintain a resilient seal in contact with said underlying surface around said weld stud and the weld produced thereby providing containment of welding products during the welding cycle while said outer edge of said interior side of said part structure moves toward said metal surface as said weld stud shortens and thereafter.

2. A part structure as claimed in claim 1, wherein said metallic weld stud is of different metal from that of said body member.

3. A part structure as claimed in claim 1, wherein said metallic weld stud is spaced from said exterior side for concealment thereby.

4. A part structure adapted for attachment to an underlying coated metal surface by electric welding, comprising
   a metallic, electrically conductive body member having an exterior side and an interior side, said interior side having a continuous outer edge adapted for contact with said coated metal surface and a central recess spaced within said outer edge
   a metallic weld stud permanently mounted in said body member at one end thereof within said recess and spaced from said continuous outer edge of said interior side and from said exterior side for concealment thereby and with its free end having a sharp point and extending beyond said interior side of said body member for contact of said point with said coated metal surface prior to contact therewith by said outer edge of said body member
   a resilient and deformable elastomeric seal element surrounding said weld stud spaced inwardly from the outer wall of said recess and having one end thereof in contact with the bottom wall of said recess and the other end adjacent the point of said weld stud for contact with said coated metal surface substantially simultaneously therewith, said seal element having a substantial volume less than that of said recess for substantial filling thereof after welding deformation
   whereby, upon application of electrical current and mechanical force to the exterior side of said body member, said sharp point of said weld stud will penetrate said coating and contact said metal surface for electrical connection and welding of said stud to said metal surface while said seal element continuously deforms within said recess to maintain a resilient seal in contact with said underlying surface around said weld stud and the weld produced thereby providing containment of welding products during the welding cycle while said outer edge of said interior side of said part structure moves toward said metal surface and thereafter.

5. A part structure as claimed in claim 4, wherein said point has an included angle of between about 60° and 90°.

6. A method of attaching a part structure to an underlying metal surface by electric welding
   said part structure including
   a metallic, electrically conductive body member having an exterior side and an interior side, said interior side having a continuous outer edge adapted for contact with said metal surface and a central recess spaced within said outer edge
   a metallic weld stud permanently mounted in said body member at one end thereof within said recess and spaced from said continuous outer edge of said interior side and from said exterior side for concealment thereby and with its free end extending beyond said interior side of said body member for contact with said metal surface prior to contact therewith by said outer edge of said body member
   a resilient and deformable elastomeric seal element surrounding said weld stud and having one end thereof in contact with the bottom wall of said recess and the other end adjacent the end of said weld stud for contact with said metal surface substantially simultaneously therewith, said seal element having a substantial volume less than that of said recess
   said method comprising
   applying electrical current and mechanical force to the exterior side of said body member with said free end of said weld stud contacting said metal surface for electrical connection and welding of said stud to said metal surface while said seal element continuously deforms within said recess while continuously maintaining a resilient seal in contact with said underlying surface around said weld stud and the weld produced thereby providing containment of welding products during the welding cycle while said outer edge of said interior side of said part structure moves toward said underlying surface as said weld stud shortens and thereafter.

7. A method as claimed in claim 6 wherein
   said seal element substantially fills said recess in contact with said underlying surface after completion of said welding cycle.

* * * * *